United States Patent
Schmidt et al.

(10) Patent No.: US 8,365,574 B2
(45) Date of Patent: Feb. 5, 2013

(54) SYSTEMS AND METHODS FOR MINIMIZING STRAY CURRENT IN CAPACITIVE SENSOR DATA

(75) Inventors: Dennis E. Schmidt, San Diego, CA (US); Joseph A. James, San Diego, CA (US); Lawrence A. Cogsdill, Coronado, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 492 days.

(21) Appl. No.: 12/632,043

(22) Filed: Dec. 7, 2009

(65) Prior Publication Data

US 2011/0133760 A1  Jun. 9, 2011

(51) Int. Cl.
*G01F 25/00* (2006.01)
*G01F 23/26* (2006.01)
*G01N 27/22* (2006.01)
*G01R 35/00* (2006.01)
*G01R 27/26* (2006.01)

(52) U.S. Cl. ........ 73/1.73; 73/304 C; 324/601; 324/606; 324/607; 324/609; 324/613; 324/679

(58) Field of Classification Search .................. None
See application file for complete search history.

(56) References Cited

U.S. PATENT DOCUMENTS

| | | | |
|---|---|---|---|
| 5,566,572 A | | 10/1996 | Pankow et al. |
| 5,854,555 A | * | 12/1998 | Sasaki ........................... 324/539 |
| 6,008,660 A | * | 12/1999 | Mahlbacher .................. 324/601 |
| 7,084,643 B2 | * | 8/2006 | Howard et al. ................ 324/663 |
| 7,109,728 B2 | * | 9/2006 | Crook et al. ................... 324/690 |
| 8,138,772 B2 | * | 3/2012 | McDonnell et al. .......... 324/658 |
| 2001/0000851 A1 | * | 5/2001 | Morimoto ..................... 73/304 C |
| 2006/0139035 A1 | * | 6/2006 | Howard et al. ................ 324/663 |
| 2007/0137315 A1 | * | 6/2007 | Harazin et al. .................. 73/1.73 |
| 2008/0092647 A1 | * | 4/2008 | Kumazawa et al. ........ 73/304 C |
| 2009/0015269 A1 | * | 1/2009 | Pinto et al. .................... 324/684 |
| 2009/0122885 A1 | * | 5/2009 | Anilkumar et al. ........... 375/260 |
| 2010/0107323 A1 | * | 5/2010 | Edelmann ..................... 324/661 |
| 2010/0241370 A1 | * | 9/2010 | Berndt ............................. 702/55 |

FOREIGN PATENT DOCUMENTS

| | | | |
|---|---|---|---|
| DE | 3415084 A1 | * | 10/1985 |
| DE | 3521974 C1 | * | 7/1986 |
| EP | 1314968 A1 | * | 5/2003 |
| GB | 2176899 A | * | 1/1987 |
| JP | 62113055 A | * | 5/1987 |
| WO | WO 8505177 A | * | 11/1985 |
| WO | WO 2008121411 A1 | * | 10/2008 |

* cited by examiner

*Primary Examiner* — Thomas P Noland
(74) *Attorney, Agent, or Firm* — Cantor Colburn LLP

(57) ABSTRACT

A method for minimizing stray current in capacitive sensor data includes receiving a first input from a first wire of a wire harness, the wire harness comprising a plurality of twisted wires, the first input comprising a first signal comprising first sensor data and stray current; receiving a second input from a second wire of the wire harness, the second input comprising a second signal comprising stray current; and subtracting the second signal from the first signal to determine the first sensor data. A system for minimizing stray current in capacitive sensor data is also provided.

4 Claims, 3 Drawing Sheets

SYSTEMS AND METHODS FOR MINIMIZING STRAY CURRENT IN CAPACITIVE SENSOR DATA

FIELD OF INVENTION

The subject matter disclosed herein generally to the field of circuitry to minimize stray capacitance effects, and more particularly, to circuitry to minimize the effects of stray capacitance on a capacitive sensor.

DESCRIPTION OF RELATED ART

In modern aircraft gauging systems, the primary sensing device is a capacitor. Capacitive gauging systems are widely used for indicating the volume as well as the mass of liquid, for example, oil in a aircraft auxiliary power unit (APU) gearbox, or fuel in an aircraft fuel tank. Such capacitive liquid level sensors have been widely accepted for many years because of their ruggedness and reliability. See U.S. Pat. No. 5,566,572, issued on Oct. 22, 1996 to Pankow et al. for further discussion of capacitive sensors.

Capacitive liquid level sensors are generally low value capacitance devices, operating in the 10 s of pico-Farads. If the sensor is located several feet away from sensor electronics, as is the case for a harsh engine environment where the control electronics is generally located far away from the engine, there may be difficulties in accurately detecting the sensor capacitance due to the stray, or parasitic, capacitance of the wiring harness connecting the sensor and the control electronics. This stray capacitance induces stray currents into the sensor circuitry, corrupting the ability of the control electronics to separate the signal data from the stray current. Diodes internal to the sensor may be used to measure the stray current; however, in applications such as an APU, having diodes installed in a sensor mounted on an engine in an uncontrolled environment is not acceptable, due to reliability issues with the diodes and solder joints in a harsh environment.

BRIEF SUMMARY

According to one aspect of the invention, method for minimizing stray current in capacitive sensor data includes receiving a first input from a first wire of a wire harness, the wire harness comprising a plurality of twisted wires, the first input comprising a first signal comprising first sensor data and stray current; receiving a second input from a second wire of the wire harness, the second input comprising a second signal comprising stray current; and subtracting the second signal from the first signal to determine the first sensor data.

According to another aspect of the invention, a system for minimizing stray current in capacitive sensor data includes a wire harness comprising a plurality of twisted wires, the wire harness being connected to a capacitive sensor, wherein a first wire of the plurality of wires carries a first signal comprising first sensor data and stray current, and a second wire of the plurality of wires carries a second signal comprising stray current; a sensor electronics module connected to the wire harness, wherein the sensor electronics are configured to subtract the second signal from the first signal to determine the first sensor data.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for minimizing stray current in capacitive sensor data are provided, with exemplary embodiments being discussed below in detail. Inclusion of an additional wire that does not carry any sensor data in a wire harness that connects the capacitive sensor to the sensor electronics allows for measurement of stray current in the wire harness. The sensor data wires, which carry both sensor data and stray current, and the additional wire are twisted together in the wire harness to ensure similar coupling of stray currents in each of the wires, such that the stray current present in each wire in the wire harness is substantially the same. This stray current may be measured in the additional wire and subtracted from the signal obtained from the sensor data wires to obtain the sensor data without the stray current. No diodes are required in the sensor electronics, lessening the probability of sensor failure.

Figure 1A:
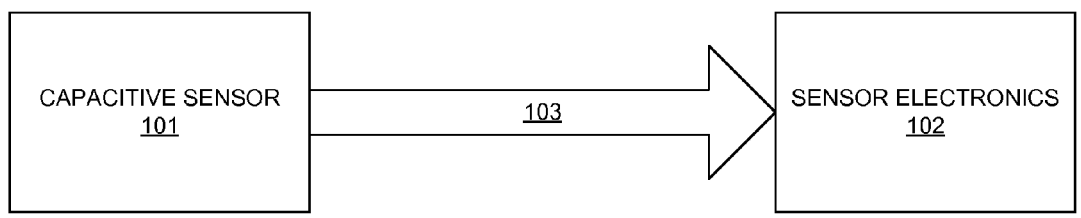
FIG. 1A illustrates an embodiment of a system for minimizing stray current in capacitive sensor data.
Figure 1B:
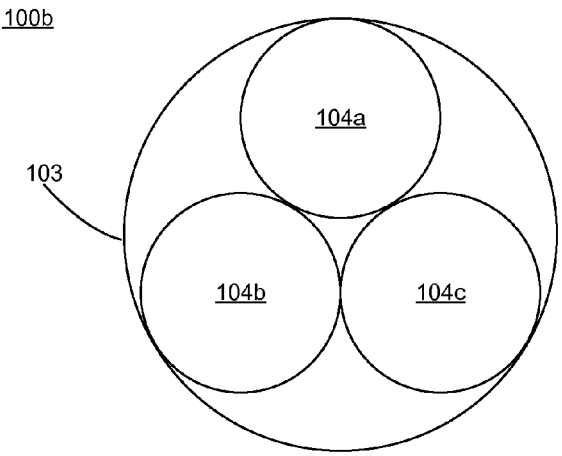
FIG. 1B illustrates an embodiment of a cross section of a wire harness for use in a system for minimizing stray current in capacitive sensor data.

FIG. 1A illustrates an embodiment of a system 100a for minimizing stray current in capacitive sensor data. Capacitive liquid level sensor 101 is coupled to sensor electronics 102 via wire harness 103. Capacitive liquid level sensor 101 may comprise a sensing capacitor (Cs) and a compensation capacitor (Cc). Sensor electronics 102 may be located at a distance of several feet or more from capacitive sensor 101, resulting in stray capacitance and stray currents in wire harness 103. FIG. 1B illustrates a cross section 100b of an embodiment of a wire harness 103. Wire harness 103 comprises 3 wires (104a, 104b, and 104c) twisted together. Wire 104a may be connected to the sensing capacitor, and wire 104b may be connected to the compensation capacitor. Wire 104c carries no sensor data information. Stray current is induced substantially equally in wires 104a, 104b, and 104c of wire harness 103. Therefore, wires 104a and 104b carry sensor data plus stray current, and wire 104c carries only stray current. Wires 104a, 104b, and 104c are shown for illustrative purposes only; wire harness 103 may comprise any appropriate number of wires.

Figure 2:
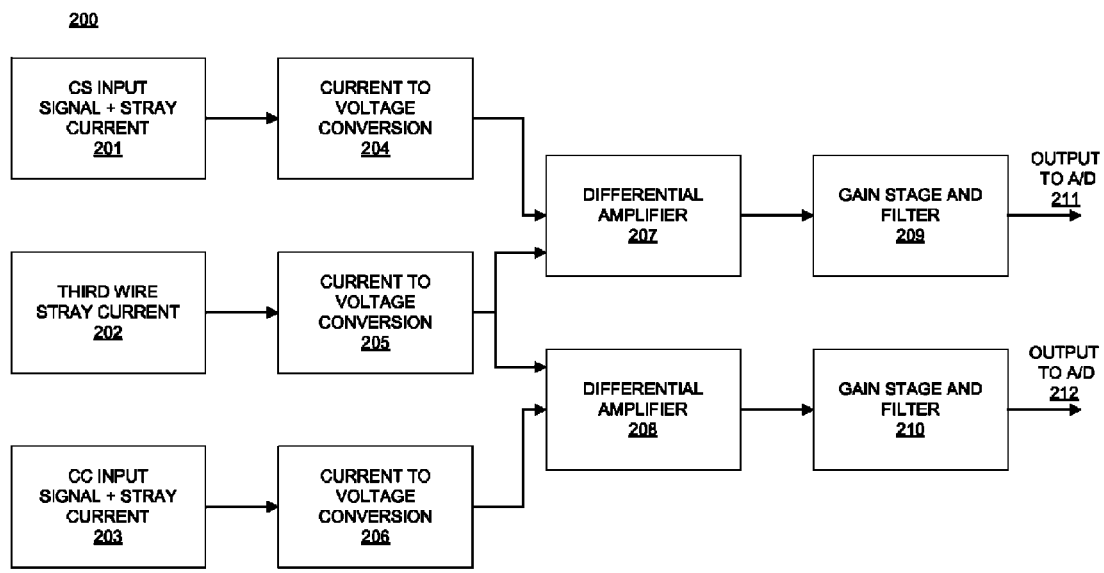
FIG. 2 illustrates an embodiment of a system for minimizing stray current in capacitive sensor data.

FIG. 2 illustrates an embodiment of a system 200 for minimizing stray current in capacitive sensor data that may be embodied in sensor electronics 102. System 200 in sensor electronics 102 is connected to wire harness 103, and has wire input 201 from wire 104a, input 202 from wire 104c, and input 203 from wire 104b. Input 201 is a signal comprising sensing capacitor data plus stray current, and input 203 is a signal comprising compensation capacitor data plus stray current. Input 202 is a signal comprising stray current. The signals from each of inputs 201, 202 and 203 are converted from current to voltage information in blocks 204-206, respectively. The voltage information from block 205, representing the stray current, is subtracted from the voltage information from block 204 by a first differential amplifier in block 207, and is also subtracted from the voltage information from block 206 by a second differential amplifier in block 208. Therefore, blocks 207 and 208 output amplified sensor data, comprising sensing capacitor data and compensation capacitor data, respectively, with the stray current removed. The outputs from blocks 207 and 208 are filtered in block 209 and 210, respectively, and output to an analog digital (A/D) converter at outputs 211 and 212.

Figure 3:
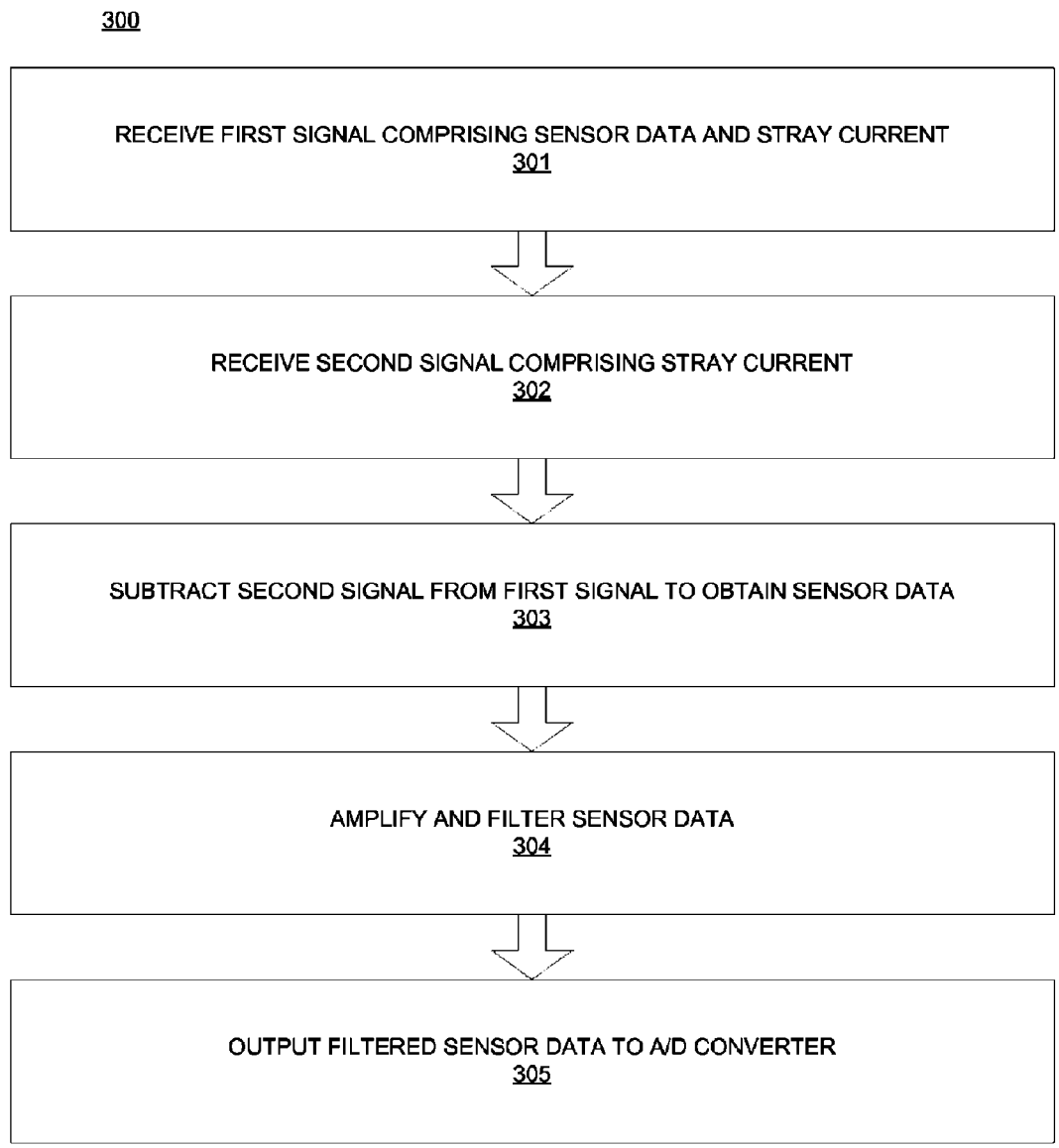
FIG. 3 illustrates an embodiment of a method for minimizing stray current in capacitive sensor data.

FIG. 3 illustrates an embodiment of a method for minimizing stray current in capacitive sensor data. In block 301, a first signal comprising sensor data and stray current is received from a first wire of a wire harness comprising a plurality of twisted wires. The sensor data may comprise data from one of a sensing capacitor or a compensation capacitor in some embodiments. The first signal may be converted from current to voltage information. In block 302, a second signal comprising stray current is received from a second wire of the wire harness. The second signal may be converted from current to voltage information. In block 303, the second signal is subtracted from first signal, removing the stray current from the sensor data to determine the sensor data. Subtraction may be performed by a differential amplifier. In block 304, the sensor data determined in block 303 is filtered. In block 305, the filtered sensor data is output to an A/D converter.

The technical effects and benefits of exemplary embodiments include determining accurate sensor information from a capacitive liquid level sensor while reducing the probability of system failure.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for minimizing stray current in capacitive sensor data, the method comprising:
   receiving, by a first current to voltage converter, a first input from a first wire of a wire harness, the wire harness comprising a plurality of twisted wires, the first input comprising a first current signal comprising first sensor data and stray current, wherein the first sensor data comprises sensing capacitor data from a capacitive liquid level sensor;
   converting the first current signal to a first voltage signal by the first current to voltage converter;
   receiving, by a second current to voltage converter, a second input from a second wire of the wire harness, the second input comprising a second current signal comprising stray current;
   converting the second current signal to a second voltage signal by the second current to voltage converter;
   receiving, by a third current to voltage converter, a third input from a third wire of a wire harness, the third input comprising a third current signal comprising second sensor data and stray current, wherein the second sensor data comprises compensation capacitor data from the capacitive liquid level sensor;
   converting the third current signal to a third voltage signal by the third current to voltage converter;
   subtracting the second voltage signal from the first voltage signal by a first differential amplifier to determine the first sensor data, wherein the first differential amplifier is directly connected to the first current to voltage converter and second current to voltage converter;
   subtracting the second voltage signal from the third voltage signal by a second differential amplifier to determine the second sensor data, wherein the second differential amplifier is directly connected to the third current to voltage converter and second current to voltage converter;
   receiving the first sensor data from the first differential amplifier by a first gain stage and filter, and outputting a filtered first sensor data signal by the first gain stage and filter to an analog-to-digital converter; and
   receiving the second sensor data from the second differential amplifier by a second gain stage and filter, and outputting a filtered second sensor data signal by the second gain stage and filter to the analog-to-digital converter.

2. The method of claim 1, wherein the capacitive liquid level sensor indicates a level of oil in an aircraft auxiliary power unit gearbox.

3. A system for minimizing stray current in capacitive sensor data, the system comprising:
   a wire harness comprising a plurality of twisted wires, the wire harness being connected to a capacitive liquid level sensor, wherein a first wire of the plurality of wires carries a first current signal comprising first sensor data and stray current, wherein the first sensor data comprises sensing capacitor data from the capacitive liquid level sensor, a second wire of the plurality of wires carries a second current signal comprising stray current, and a third wire of the plurality of wires carries a third current signal comprising second sensor data and stray current, wherein the second sensor data comprises compensation capacitor data from the capacitive liquid level sensor;
   a first current to voltage converter configured to receive the first current signal from the first wire and convert the first current signal to a first voltage signal;
   a second current to voltage converter configured to receive the second current signal from the second wire and convert the second current signal to a second voltage signal;
   a third current to voltage converter configured to receive the third current signal from the third wire and convert the third current signal to a third voltage signal;
   a first differential amplifier configured to subtract the second voltage signal from the first voltage signal to determine the first sensor data, wherein the first differential amplifier is directly connected to the first current to voltage converter and second current to voltage converter;
   a second differential amplifier configured to subtract the second voltage signal from the third voltage signal by to determine the second sensor data, wherein the second differential amplifier is directly connected to the third current to voltage converter and second current to voltage converter;
   a first gain stage and filter configured to receive the first sensor data from the first differential amplifier and output a filtered first sensor data signal to an analog-to-digital converter; and
   a second gain stage and filter configured to receive the second sensor data from the second differential amplifier and output a filtered second sensor data signal to the analog-to-digital converter.

4. The system of claim 3, wherein the capacitive liquid level sensor indicating indicates a level of oil in an aircraft auxiliary power unit gearbox.

* * * * *